T. A. WILLARD.
MACHINE FOR FORMING STORAGE BATTERY JARS.
APPLICATION FILED FEB. 25, 1916.
1,314,627.
Patented Sept. 2, 1919.
5 SHEETS—SHEET 5.
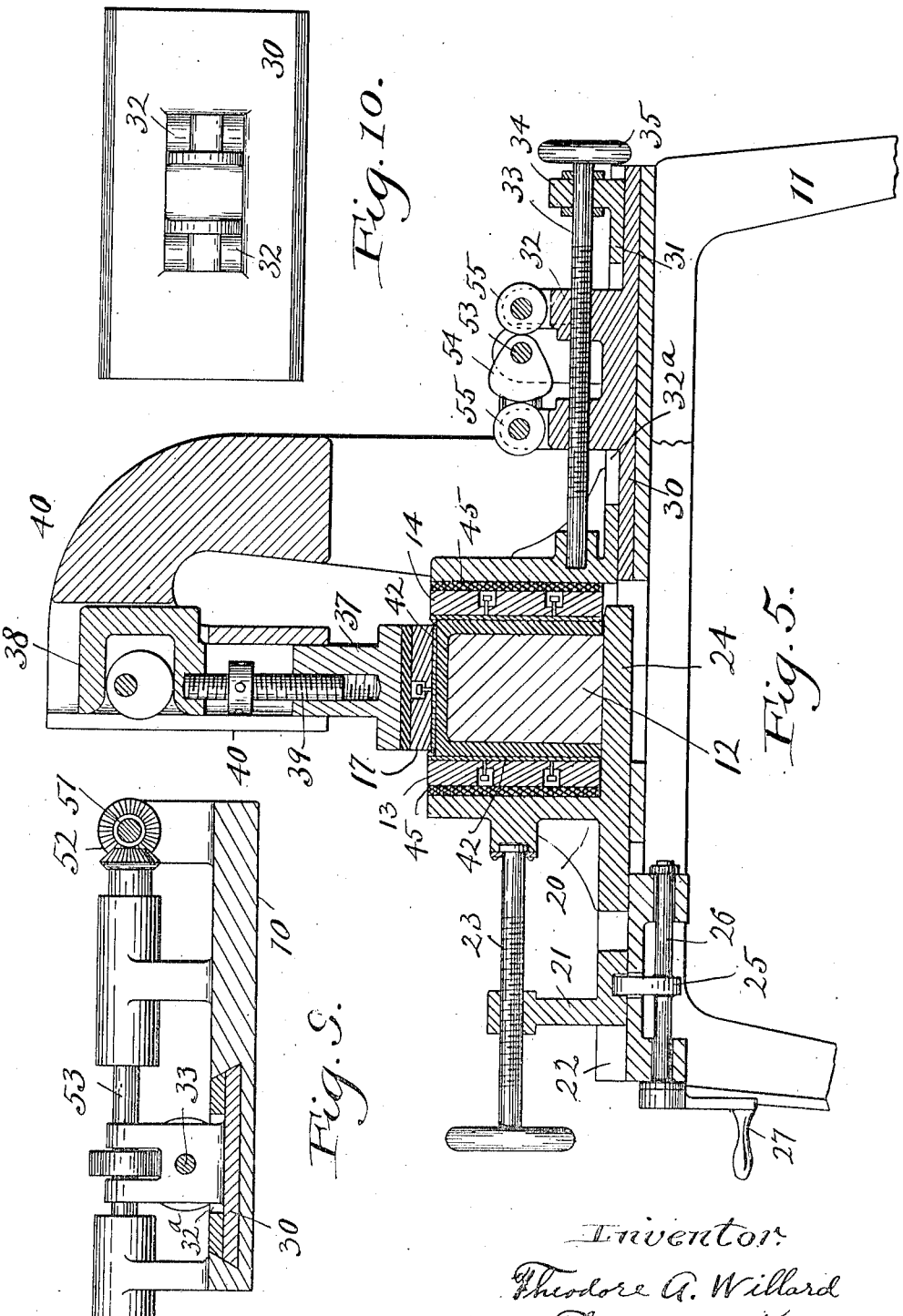

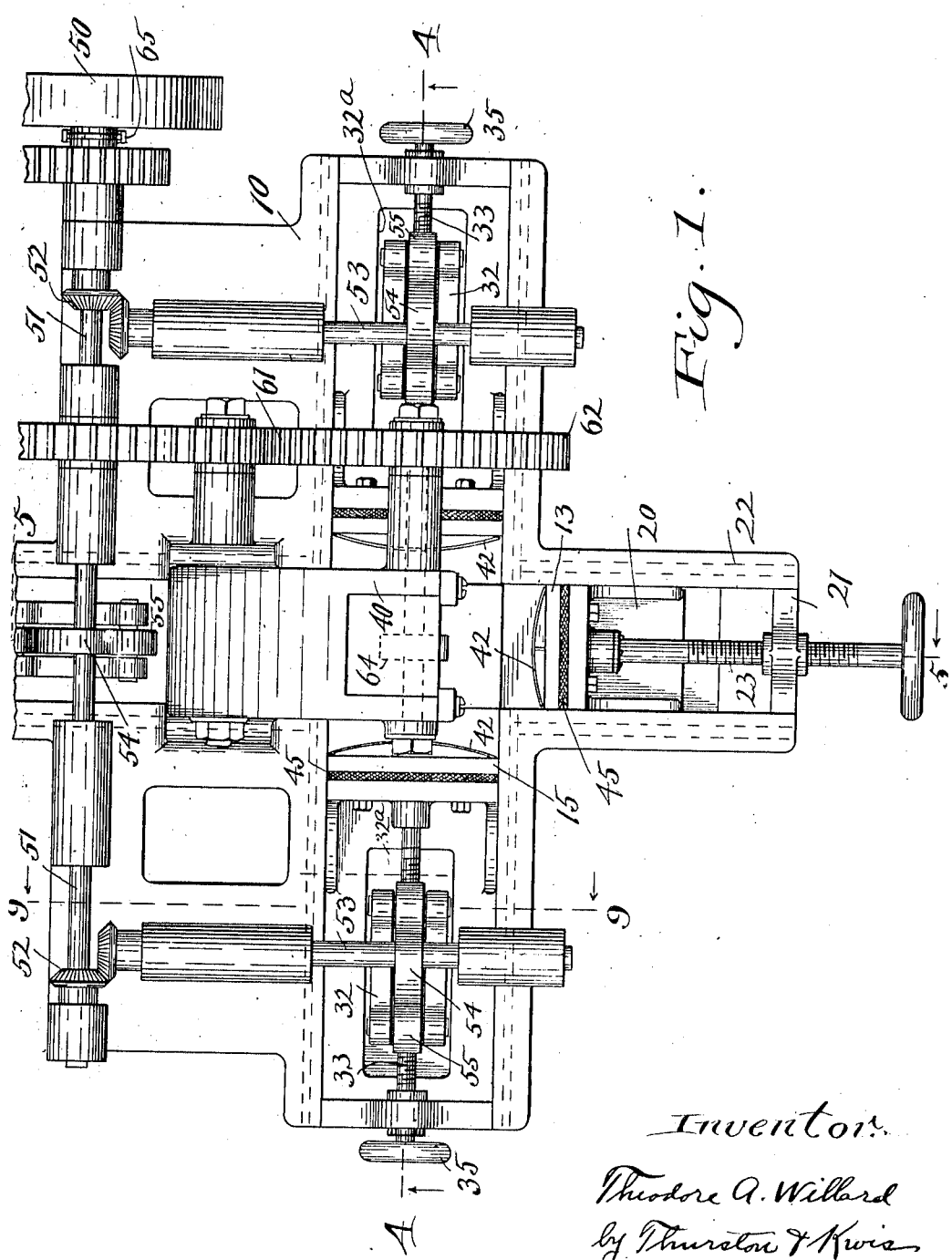

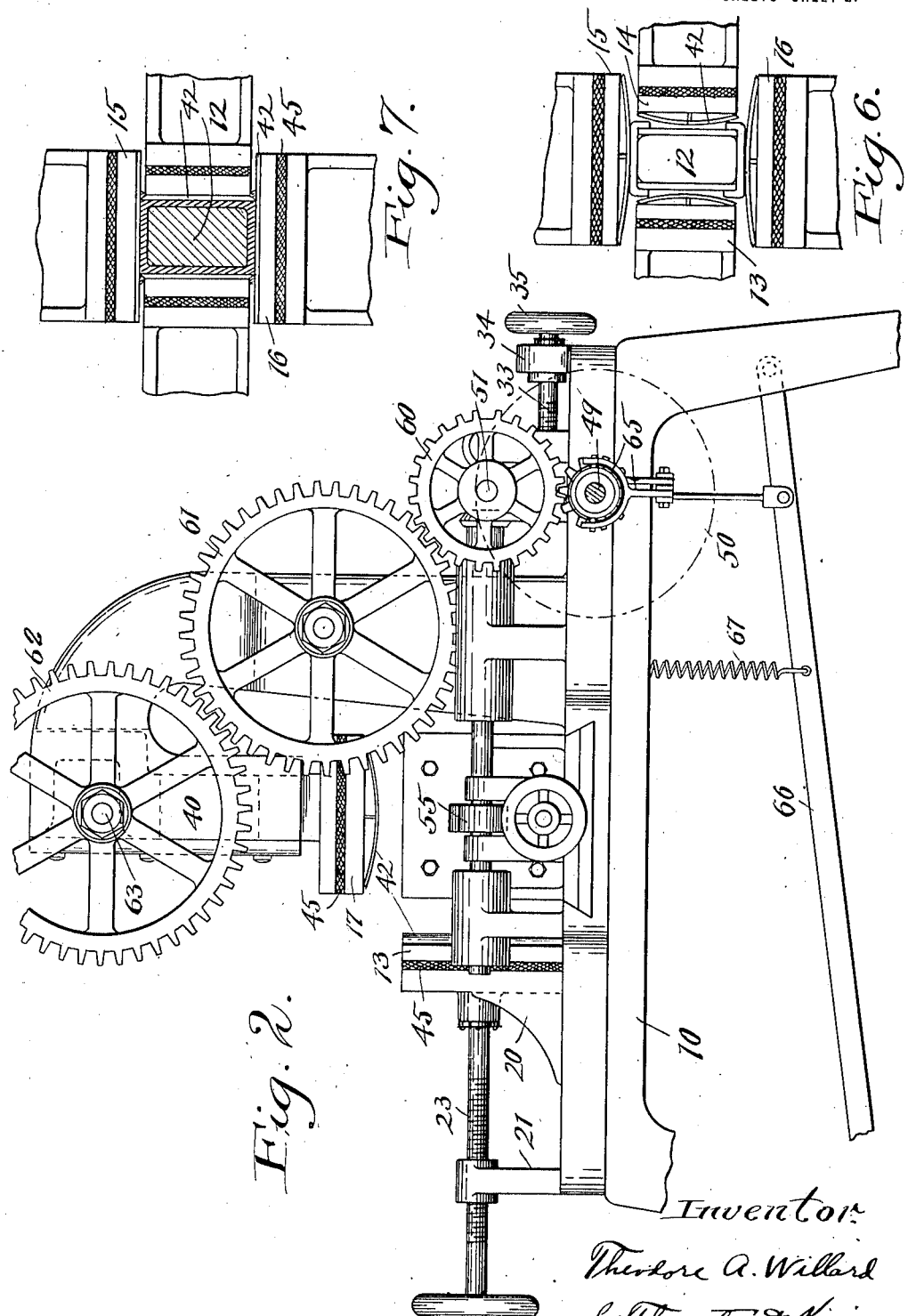

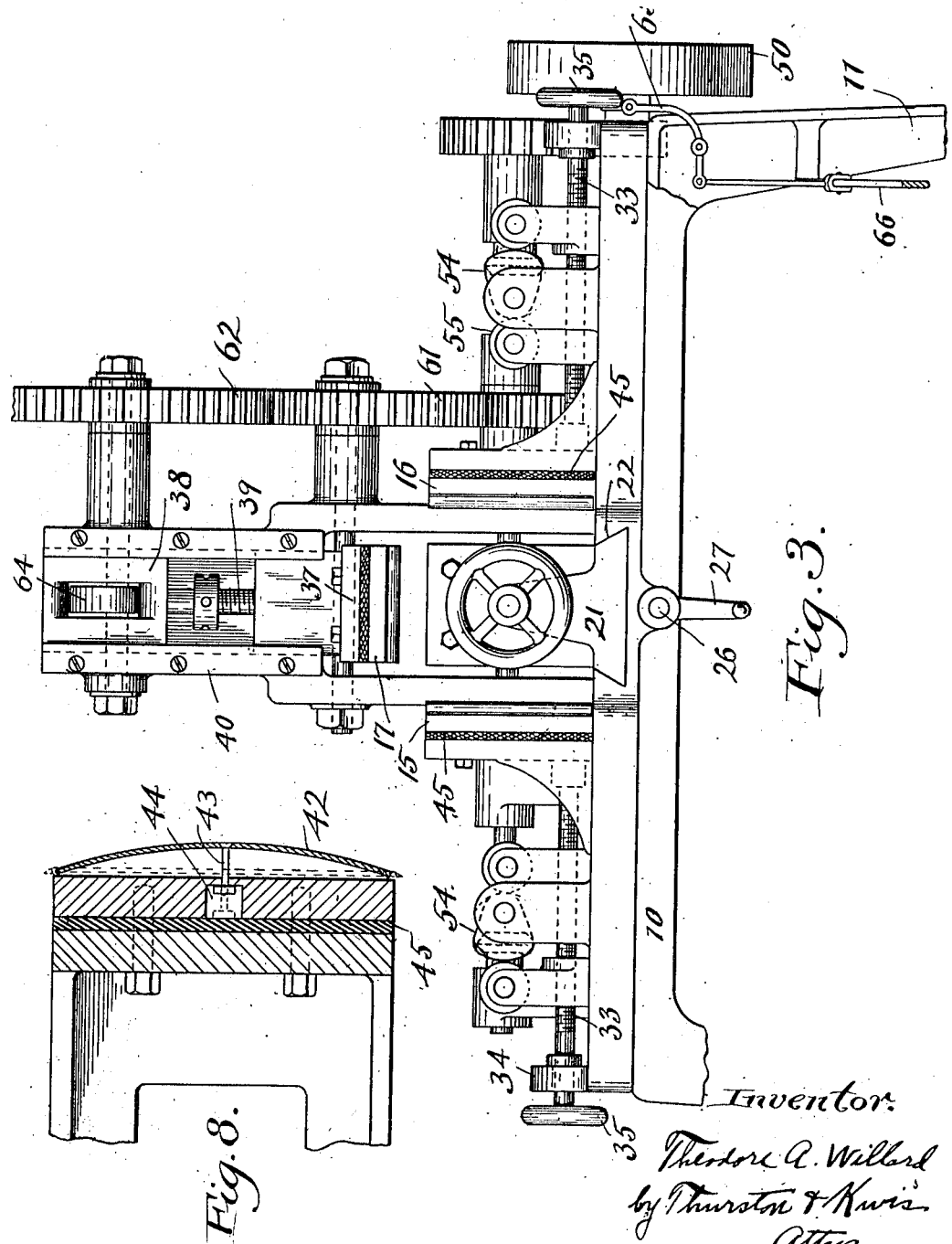

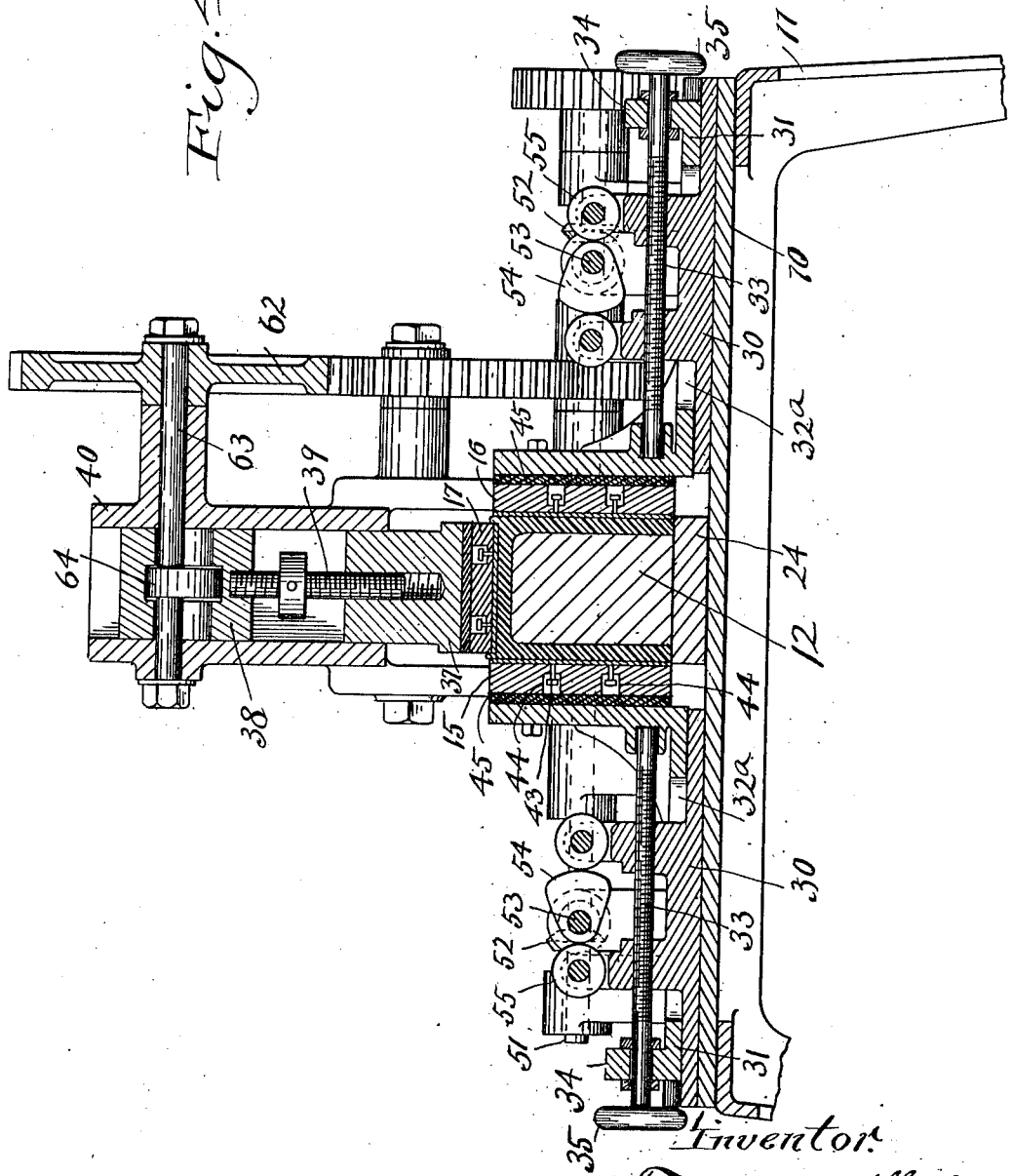

UNITED STATES PATENT OFFICE.

THEODORE A. WILLARD, OF CLEVELAND, OHIO.

MACHINE FOR FORMING STORAGE-BATTERY JARS.

1,314,627.  Specification of Letters Patent.  Patented Sept. 2, 1919.

Application filed February 25, 1916. Serial No. 80,348.

*To all whom it may concern:*

Be it known that I, THEODORE A. WILLARD, a citizen of the United Sates, residing at Cleveland, in the county of Cuyahoga and State of Ohio, have invented a certain new and useful Improvement in Machines for Forming Storage-Battery Jars, of which the following is a full, clear, and exact description.

This invention relates to a machine for forming vessels from plastic material, and particularly storage battery jars from uncured rubber.

The object of the invention is to provide a machine by which plastic rubber can be placed around or against the faces of a mandrel and compressed against the mandrel in such a way as to form the corners or to unite the sheets or slabs of rubber so that when vulcanized a jar is formed which is no weaker and is preferably stronger at the corners than at other points and is without seams or joints. A further object is to accomplish this in such a manner that there is a minimum loss due to defective jars, and so that the jars can be formed rapidly without requiring skilled or expensive labor or a fine quality of rubber which has been required heretofore with the hand methods.

More generally considered, it is the object of this invention to provide an efficient jar making machine which produces jars which are better than those produced by the hand methods, and which is economical in the sense that it permits jars to be formed much more cheaply than with the hand methods.

In the machine constructed in accordance with the present invention I utilize a plurality of dies or plungers which are arranged opposite the sides and over the top of the mandrel, and actuate these dies by mechanical means which causes the dies to compress the material the desired extent to produce practically perfect jars. As another feature of the invention the dies are provided with normally bowed spring metal faces which serve to press the air out from between the mandrel and the rubber or between the rubber and the dies, and also prevent the die sticking to the rubber when the dies are retracted, and further they not only form the corners, but at their longitudinal edges cut or trim off the surplus rubber so as to minimize the grinding which is to be done to produce a jar with a smooth exterior.

The invention consists further in certain novel details of construction and combination and arrangement of parts which includes the manner of actuating the dies, manner of mounting them for purposes of adjustment, and other features which will be described in the specification and set forth in the appended claims.

In the accompanying sheets of drawings, Figure 1 is a top plan view of the major portion of the machine; Fig. 2 is a side view viewed from the right of Fig. 1; Fig. 3 is a side view viewed from the left of Fig. 2; Fig. 4 is a sectional view substantially along the line 4—4 of Fig. 1 looking in the direction indicated by the arrows; Fig. 5 is a sectional view substantially along the line 5—5 of Fig. 1 looking in the direction indicated by the arrow; Fig. 6 is a horizontal sectional view through the mandrel and horizontally movable dies with the latter partly retracted; Fig. 7 is a similar view after the dies have been actuated; Fig. 8 is a sectional view through one of the die faces showing the same on an enlarged scale; Fig. 9 is a sectional view substantially along the line 9—9 of Fig. 1 looking in the direction indicated by the arrows; and Fig. 10 is a top plan view of one of the parts of a die carrier.

The machine includes a horizontal bed 10 mounted on suitable legs 11 and supporting all the operating mechanism. Adapted to be supported on a tongue of one of the dies in a manner to be hereinafter explained, is a mandrel which is illustrated at 12. Arranged opposite the upright faces or the sides and ends of the mandrel are four dies including the dies 13 and 14 which are arranged opposite two opposite sides of the mandrel when in operative position, and two dies 15 and 16 which are arranged opposite the other two sides of the mandrel. In addition I employ a fifth die 17 which is above the mandrel and is adapted to form the bottom of the jar. The four first named dies are adapted to be moved horizontally inward toward the mandrel or outwardly away from the mandrel, and the last named die 17 is adapted to be actuated vertically, that is, downwardly, toward the mandrel, or upwardly away from the mandrel.

In the preferred embodiment of my invention, four of the dies are power-actuated, and one of the horizontally movable dies, in this case the die 13, is hand-actuated. This hand-actuated die 13 is connected to a die carrier or base composed of two parts 20 and 21 which slide in a guideway 22 of the base and are connected by a screw 23 which normally holds the two parts in predetermined relative positions, but when turned adjusts the position of the forward part 20 with reference to the rear part 21 as when jars of different sizes are to be formed. The forward part 20 of the die carrier or support is provided with a forwardly projecting tongue 24 on which the mandrel is supported during the jar forming operation. In operating the machine the mandrel with rubber applied to the faces thereof will be placed on the tongue 24 when the die is retracted and thence the operator will shove the die together with the two parts of the die support forwardly to operative position, and will thence lock the die in place. The locking means here shown includes a locking cam 25 mounted on a shaft 26 and adapted to extend up into registering slots in the base 10 and in the lower part of the rear part 21 of the die carrier. A handle 27 or other suitable operating member at the outer end of the shaft 26 permits the die support to be locked or unlocked. In adjusting the two parts relatively the rear part 21 will be locked so that when the hand screw is turned only the front part 20 of the die carrier and the die will be moved.

The other three horizontally movable dies are likewise capable of adjustment to vary the limits of movement of the dies as they are moved inwardly and outwardly. Each of these last mentioned dies is carried by a two-part die carrier including a lower part 30 and an upper part 31, both of which are normally relatively fixed in position and are adapted to be moved back and forward in a guideway of the bed. The lower part 30 of the die carrier has a roller support 32 which projects upwardly through a rectangular shaped opening 32ᵃ in the upper part 31 of the die carrier. This roller support and the manner of actuating the dies will be referred to presently. Furthermore, the two parts 30 and 31 can be adjusted relatively to vary the limits of movement of the die, that is, the position of the die when at its innermost position and the position of the die when at its outermost position, by means of a screw or threaded shaft 33, having a threaded part passing through the roller support 32, and passing through an upstanding part 34 of the upper part of the die carrier. This shaft which may be provided at its outer end with a hand wheel 35 can be turned to adjust the position of the die relative to the roller support 32 when it is desired to vary the size of the jars which are formed on the machine. It will be understood that the construction of the die supports for the dies 14, 15, 16, will be precisely like that described, and that the three dies can be adjusted in precisely the same manner. It may be stated, however, that while I have shown separate hand operated adjusting screws for all the dies, the two oppositely disposed dies 15 and 16 may be adjusted simultaneously by a shaft extending beneath the bed of the machine, inasmuch as when one of these dies is adjusted the other die will be adjusted an exactly similar amount.

The upper die 17 is carried by a die holder composed of a lower part 37 and an upper part 38, which are capable of relative adjustment by means of a screw or threaded shaft 39. These elements of the die support move vertically in a guideway which is directly above the mandrel when in operative position in the machine, said guideway being formed in a portion of a standard 40 projecting upwardly from the frame, as shown particularly in Figs. 2 and 5. The lower part of the standard 40 is bifurcated forming a space for the rear die 14 and the operating mechanism therefor.

Preferably the dies 13, 14, 15, 16, 17, are provided on their faces with spring metal faces 42 normally convex or bowed outwardly at the middle, as shown particularly in Fig. 8. Each of these spring metal die faces is secured to the corresponding die by pins or bolts 43, two of which are preferably employed having at their inner ends heads which are adapted to move in recesses 44 in the die so that when the jar is compressed the die faces can flatten. The inner ends of the pins 43 are preferably flush with the die faces, so as not to extend beyond the inner surface, that is, the surface facing the rubber or mandrel. These die faces perform several functions which include forcing out the air from between the die faces and rubber and from between the rubber and mandrel. They also prevent the rubber sticking to the die when the die is retracted for the reason that as the die is retracted the edge portions of the die face first leave the rubber, and finally the middle portion leaves the rubber. These die faces also shape or form the corners of the jar, and in a preferred embodiment of my invention the upright edges of the die faces act as blades or cutters to cut or trim off the overflow rubber at the corners of the jar, as illustrated in Fig. 7. While these spring metal die faces are preferably employed, they are not essential to the successful operation of the machine. By facing the rubber with tin the rubber will not stick to the dies.

Between each die and the upright part of the corresponding die carrier I provide yieldable connecting means such as a strip or sheet of rubber 45 which may be provided with perforations to enhance its elasticity, so that in spite of the fact that the dies are actuated inwardly predetermined distances, the die faces or dies proper admit of slight inequalities in the thickness of the rubber without any breakage or deformation of the jar being formed.

The four dies, except the hand operated die 13, are power-operated, as before stated, and preferably they are operated by mechanical means which moves the dies inwardly a predetermined or fixed distance, and thence outwardly a fixed or definite distance. The mechanism for operating the dies in this case includes a power shaft 49 to which power may be applied by any suitable means, such as by a pulley 50. This shaft 49 is geared to a horizontal shaft 51 which extends over the bed and which through bevel gearing 52 drives a pair of shafts 53 which actuate the two oppositely disposed dies 15 and 16. These shafts are provided with die actuating cams 54, each arranged between rollers 55 which are a predetermined distance apart and are supported on the roller support 32 of the die carrier for the corresponding die. The rear die 14 is actuated by a similar cam 54, which is fixed to the shaft 51 (see Figs. 1 and 5) and is between a pair of similar rollers 55 carried in the roller support 32 projecting from the die carrier for the rear die 14. The upper die is actuated through gears 60, 61, 62, which connect the shaft 51 to a shaft 63 at the top of the standard 40 and by a cam 64 which is mounted on the shaft 63 within the upper die supporting part 38 in the manner illustrated particularly in Fig. 5.

The shaft 49 which is continuously operated whereas the other die actuating shafts are preferably intermittently operated, is connected to the shaft 51 through gearing and through the medium of a clutch which in Fig. 2 is designated as a whole by the reference character 65. This clutch is actuated by a clutch pedal or lever 66 normally held or pulled upwardly by a spring 67 to unclutch the shafts 49 and 51 and is adapted to be depressed by the operator to cause the shaft 49 to drive the shaft 51 as well as the the other parts of the die actuating mechanism.

In the operation of the machine above described the operator will place on the tongue 24 of the die support for the hand actuated die 13 a mandrel to, which are applied sheets or slabs of rubber. Five separate slabs of rubber may be applied, four to the sides and one over the top, or a less number may be employed, as for example, three slabs, in which event one will extend along the sides and over the top and the other two will be placed against the other two opposite sides. After the mandrel with the rubber applied thereto is placed on the tongue 24 the operator will move the die 13 and mandrel inwardly from the retracted position of the die to the operative position and will lock the die in the latter position by the locking means 25, 26 and 27. He will then depress the clutch lever 66, whereupon the other dies will be operated. The latter may be operated either simultaneously or successively, it being possible to actuate the dies at the same time or in any desired predetermined order by properly positioning the die actuating cams, which may be set at any desired positions. As the dies are actuated they compress the rubber and form the corners of the jar, uniting the slabs at the corners in such a way that when the jar is vulcanized there is absolutely no evidence of a seam or joint, and in forming the corners the rubber is pressed inwardly so as to form fillets on the inside of the jar or at the corners thereof. The fact that the fillets are formed and the fact that the slabs of rubber are united so effectively at their edges or at the corners of the jar, cause the jar to be even stronger at the corners than at any other point, as is proven in practice. With the hand-operated methods a fillet could not be formed, nor could the joints or seams be made without causing the jar to be weakest at the corners and at the seams or joints.

After the top mandrel is forced downward in the manner above explained, so as to form the top of the jar, all dies are held in the innermost positions for a predetermined interval of time so as to allow the rubber to set and form the corners. There is, however, very little flow of rubber, there being just enough flow to form the corners and to permit the slight overflow which usually takes place. The order in which the rams are actuated and the length of time that the rubber is under compression by all the dies is determined by the shape and the positioning of the die actuating cams.

After the dies are retracted the operator will remove his foot from the clutch lever 66, whereupon the dies remain stationary in their retracted position; then the operator will retract the hand-operated die, remove the now formed but still unvulcanized jar from the machine and will place on the tongue 24 another mandrel to which the rubber has been applied. After the jars are formed on the mandrels in the manner above explained they will be placed in a vulcanizer and will be vulcanized to harden the rubber and cause the rubber to be thoroughly knit together where united by the dies.

It is to be noted that the edges of the spring metal faces trim off the surplus or overflow rubber as the said faces are flattened, thus eliminating or at least minimizing grinding necessary for the production of jars with smooth exterior surfaces.

Having thus described my invention, what I claim is:—

1. In a machine for forming storage battery jars from uncured rubber, a bed, a mandrel, rams arranged opposite the upright sides and top of the mandrel, one of said rams being manually movable forward and rearward, means for locking or holding said mandrel in its forward position, and power mechanism for actuating the remainder of the rams and serving to move the same predetermined distances relative to the mandrel.

2. In a machine for forming storage battery jars from uncured rubber, a bed, a mandrel, a support for the mandrel, rams arranged opposite the sides and top of the mandrel and adapted to compress the rubber against the faces thereof, power mechanism for actuating certain of the rams, said rams being composed of a plurality of parts, yieldable material being arranged between two of the parts and two of the parts being relatively adjustable, one of the last mentioned parts being engaged by the power mechanism and the other being between said part and the rubber to be compressed.

3. In a machine for forming storage battery jars and the like, a bed, a mandrel, rams or dies arranged opposite the faces of the mandrel and adapted to compress material against the faces thereof, rotary cams for actuating part of the dies, and means movable with the dies and engaged by the cams for transmitting movement between the cams and dies, said dies being composed of relatively adjustable parts, one carrying the means which are engaged by the cam and the second being between said part and the mandrel.

4. In a machine for forming storage battery jars and the like, a bed, a mandrel, rams or dies arranged opposite the faces of the mandrel and adapted to compress material against the faces thereof, rotary cams for actuating part of the dies, means on both sides of and adapted to be engaged by the cams and movable with the dies for causing the dies to be positively moved forward and rearward relatively to the mandrel, the means carried by each die adapted to be engaged by a cam being adjustable relative to the part of the die which compresses the material.

5. In a machine for forming storage battery jars, a mandrel, dies arranged opposite the faces of the mandrel, die carriers for the dies, each carrier composed of a pair of relatively adjustable parts, and power means engaging one of said parts of each of certain of the dies to actuate the same a predetermined distance.

6. In a machine for forming storage battery jars, a mandrel, dies arranged opposite the faces of the mandrel, die carriers for the dies, each carrier composed of a pair of relatively adjustable parts, one of said parts carrying the die, means adapted to engage and positively shift the other part a predetermined distance at each stroke of the die, and means for adjusting said parts relatively.

7. In a machine for forming storage battery jars and the like, a horizontal bed, a plurality of guideways in the bed, dies arranged in pairs with the dies of each pair facing each other and movable lengthwise of said guideways forwardly or inwardly and rearwardly or outwardly, a die carrier for each die, each die carrier being composed of normally relatively fixed parts, and means for adjusting the relative positions of said parts.

8. In a machine for forming storage battery jars and the like, a horizontal bed, a plurality of guideways in the bed, dies arranged in pairs with the dies of each pair facing each other and movable lengthwise of said guideways forwardly or inwardly and rearwardly or outwardly, a die carrier for each die, each carrier being composed of relatively adjustable parts, the die being connected to one of said parts, and means operatively associated with the other parts for actuating the same.

9. In a machine for forming storage battery jars, a mandrel, dies movable toward and from the faces of the mandrel and adapted to compress material applied to the faces of the mandrel, said dies having spring metal faces, the latter having cutting edges adapted to project beyond the sides of the dies.

10. In a machine for forming storage battery jars and the like, a plurality of dies adapted to compress material applied to the faces of a mandrel, spring metal faces carried by said dies arranged so as to cut off surplus rubber when the dies are moved inwardly toward the mandrel.

11. In a jar forming machine, a bed, a mandrel against which material is adapted to be compressed to form a jar, a plurality of guideways, a plurality of dies, die carriers movable in the guideways, one of the dies being manually movable forwardly and rearwardly, means for locking or holding said die in its forward position, a power operated means for moving the other dies predetermined or fixed distances.

12. In a jar forming machine, a bed, a mandrel against which material is adapted to be compressed to form a jar, a plurality of guideways, a plurality of dies, die carriers movable in the guideways, one of the dies being manually movable forwardly and rearwardly, means for holding said die in its forward position, a power operated means for moving the other dies predetermined or fixed distances, said manually movable die having a portion associated therewith constituting a support for the mandrel.

In testimony whereof, I hereunto affix my signature.

THEODORE A. WILLARD.